(12) United States Patent
Thanheiser

(10) Patent No.: US 7,217,308 B2
(45) Date of Patent: May 15, 2007

(54) CLOSING DEVICE FOR HOUSING

(75) Inventor: Andreas Thanheiser, Bonn (DE)

(73) Assignee: Montaplast GmbH, Morsbach (DE)

( * ) Notice: Subject to any disclaimer, the term of this patent is extended or adjusted under 35 U.S.C. 154(b) by 212 days.

(21) Appl. No.: 10/415,603

(22) PCT Filed: Oct. 29, 2001

(86) PCT No.: PCT/EP01/12491

§ 371 (c)(1),
(2), (4) Date: Sep. 2, 2003

(87) PCT Pub. No.: WO02/36242

PCT Pub. Date: May 10, 2002

(65) Prior Publication Data

US 2004/0025480 A1 Feb. 12, 2004

(30) Foreign Application Priority Data

Oct. 31, 2000 (DE) .................................. 100 53 983

(51) Int. Cl.
*B01D 46/10* (2006.01)

(52) U.S. Cl. .............................. 55/493; 55/495; 55/497; 55/502; 55/503; 55/504; 55/544; 55/DIG. 31; 95/273; 123/198 E; 220/3.8; 220/3.92; 220/3.94; 220/4.22; 220/4.31; 220/7; 220/538; 220/539; 220/540; 220/542

(58) Field of Classification Search ............... 55/385.3, 55/493, 497, 502, 503, 511, 521, 498, DIG. 31, 55/504, 495; 123/198 E; 95/273; 220/3.8, 220/3.92, 3.94, 4.22, 4.31, 7, 538–540, 542
See application file for complete search history.

(56) References Cited

U.S. PATENT DOCUMENTS 5,125,941 A * 6/1992 Ernst et al. ................... 55/480

(Continued)

FOREIGN PATENT DOCUMENTS

DE 4332559 3/1995

(Continued)

*Primary Examiner*—Minh-Chau T. Pham
(74) *Attorney, Agent, or Firm*—Grossman Tucker Perreault & Pfleger, PLLC (57) ABSTRACT

This invention relates to a closing device for a housing of an air filter that can be closed with a housing cover. The assembly process is to be simplified and accelerated, while the number of parts required is to be reduced at the same time. According to the invention, this is achieved in that the housing cover and the housing can be connected to one another by means of a locking frame which surrounds the housing cover and the housing in the region of the housing edge, said locking frame being positionable in closed position by means of translatory motion, in which position it presses the housing cover onto the housing edge.

7 Claims, 10 Drawing Sheets

U.S. PATENT DOCUMENTS

| | | | |
|---|---|---|---|
| 5,222,488 A | 6/1993 | Forsgren | |
| 5,227,074 A | 7/1993 | Nichols et al. | |
| 5,569,311 A * | 10/1996 | Oda et al. | 55/493 |
| 5,605,554 A * | 2/1997 | Kennedy | 55/493 |
| 5,725,624 A * | 3/1998 | Ernst et al. | 55/502 |
| 5,730,768 A * | 3/1998 | Kaminaga et al. | 55/385.3 |
| 5,740,774 A * | 4/1998 | Kennedy | 123/198 E |
| 6,159,260 A * | 12/2000 | Hammes | 55/502 |
| 6,174,343 B1 * | 1/2001 | Bloomer | 55/385.3 |
| 6,200,465 B1 * | 3/2001 | Carawan et al. | 210/94 |
| 6,217,627 B1 * | 4/2001 | Vyskocil et al. | 55/492 |
| 6,293,984 B1 * | 9/2001 | Oda et al. | 55/497 |
| 6,306,192 B1 * | 10/2001 | Greif et al. | 55/498 |
| 6,375,700 B1 * | 4/2002 | Jaroszczyk et al. | 55/498 |
| 6,568,540 B1 * | 5/2003 | Holzmann et al. | 210/445 |
| 6,723,148 B2 * | 4/2004 | Stass | 55/385.3 |
| 6,866,694 B2 * | 3/2005 | Moreau et al. | 55/385.3 |
| 2005/0022484 A1 * | 2/2005 | Krisko et al. | 55/337 |

FOREIGN PATENT DOCUMENTS

DE      44 33 840      3/1996

* cited by examiner

CLOSING DEVICE FOR HOUSING

BACKGROUND

The invention relates to a closing device for an essentially box or shell-shaped housing that can be closed by a housing cover for accommodating objects, particularly an air filter housing for a motor vehicle or the like, displaying a housing edge with a seal, onto which the housing cover connectable to the housing can be placed.

The air filter housing accommodates an air filter and is provided with the necessary feed and discharge lines. Mounted on the edge, between the housing cover and the housing, is a rubber seal, which is preferably designed as a sealing ring in order to achieve a tight fit between the air filter housing and the housing cover when the housing cover is in place.

It is familiar practice for securing the housing cover on the housing to use several clamps, screws, plastic clips or the like as connectors distributed around the circumference, in order to obtain a tight connection between the two components. The connectors have to be mounted individually in a time-consuming process during assembly. The clips or clamps, which are preferably made of plastic, can snap off and may then have to be replaced. Screws first have to be positioned and then screwed in using a tool. All these types of connectors can be dropped during assembly and have to be picked up, this not being possible without further ado in an automated process. In any case, several manual operations are necessary in order to implement the circumferential fastening necessary for a tight connection. On the whole, assembly is very time-consuming when using any of the fastening methods familiar from the prior art. In addition, tools are necessary, which may also be dropped.

SUMMARY OF THE INVENTION

The object of the present invention to is facilitate and accelerate the assembly of an air filter housing.

According to the invention, the object is solved in that the housing cover and the housing can be connected to one another by means of a locking frame which surrounds the housing cover and the housing in the region of the housing edge, said locking frame being positionable in closed position by means of translatory motion.

During final assembly of the air filter, the housing cover is placed on the seal of the housing edge and pressed down, so that the housing cover covers the entire edge of the housing. Axial force is then applied to displace the locking frame relative to the housing cover and the housing and move it into the closed position. In this position, the locking frame reaches around the housing and the housing cover in the manner of a clamp, pressing the two parts together in tightly sealing fashion.

The locking frame can be designed either as a closed profile, or as an open or slotted profile.

Due to the fact that the housing cover is not moved in relation to the housing during assembly, only the locking frame being moved relative to the stationary housing cover/housing, the sealing ring located in the housing edge is not subjected to any shearing forces that could result in displacement of the seal and thus in leaks. Consequently, the closing device according to the invention permits simple, two-handed assembly, without tools and without a need for any other connectors, such as screws, clips or hooks. In the same way, the housing cover can be detached from the housing without tools. In the simplest case, only two components are necessary, namely the air filter housing and the unit comprising the locking frame/housing cover. Finally, the closing device according to the invention permits greater freedom in terms of design and geometry, as no fastening elements or devices for this purpose have to be provided in the edge area.

If the locking frame is not designed as a closed profile, but is provided with a joint at one point, the locking frame can be of partially elastic design, allowing it to be bent open in order to simplify assembly.

Assembly is particularly facilitated if the locking frame is designed as a one-piece, closed profile and to be torsion-resistant. It has proven to be particularly expedient with this design that at least the edge of the housing cover can be connected to a side of the locking frame that is on top in installed position, that the housing cover is mounted in a manner permitting relative movement in the locking frame and that a side of the locking frame that is on the bottom in installed position can be placed on the housing edge and the locking frame connected to the housing by means of relative displacement. During pre-assembly, this design makes it possible first to insert the housing cover into the locking frame in such a way that it is mounted in a manner permitting relative movement in the locking frame. During final assembly of the air filter, the unit comprising the housing cover and the locking frame is placed on the housing edge, pressed down and fixed in place by displaying the locking frame in relation to the stationary housing/housing cover.

In order to prevent unintentional relative displacement of the locking frame from the closed position, snap-in elements can be provided between the housing cover and the locking frame and/or the locking frame and the housing, these elements engaging each other or reaching behind each other when in locked position.

In a preferred configuration, one or more snap-in tabs are provided on the housing cover, these having run-up bevels that extend in the direction of thrust and snap-in cams that run essentially perpendicular to the direction of thrust and engage a snap-in recess provided on the locking frame when in closed position.

The snap-in elements are customarily of elastic design, so as to achieve a more easily separable connection between the housing, the housing cover and the locking frame.

Like the air filter housing, the locking frame is preferably designed as an injection-moulded part, as plastics can be moulded easily and as required. Alternatively, the parts can be made of metal, or combinations of different materials can also be used.

BRIEF DESCRIPTION OF THE DRAWINGS

The invention is described in the drawings on the basis of a preferred practical example. The figures show the following.

DESCRIPTION OF THE INVENTION

Accordingly, the air filter housing consists of an essentially box-shaped housing 1 for accommodating an air filter not shown in detail. Housing 1 can be sealed in airtight fashion by housing cover 2, which is placed on housing edge 3 and can be connected to housing 1 by means of locking frame 4 according to the invention.

Figure 3:
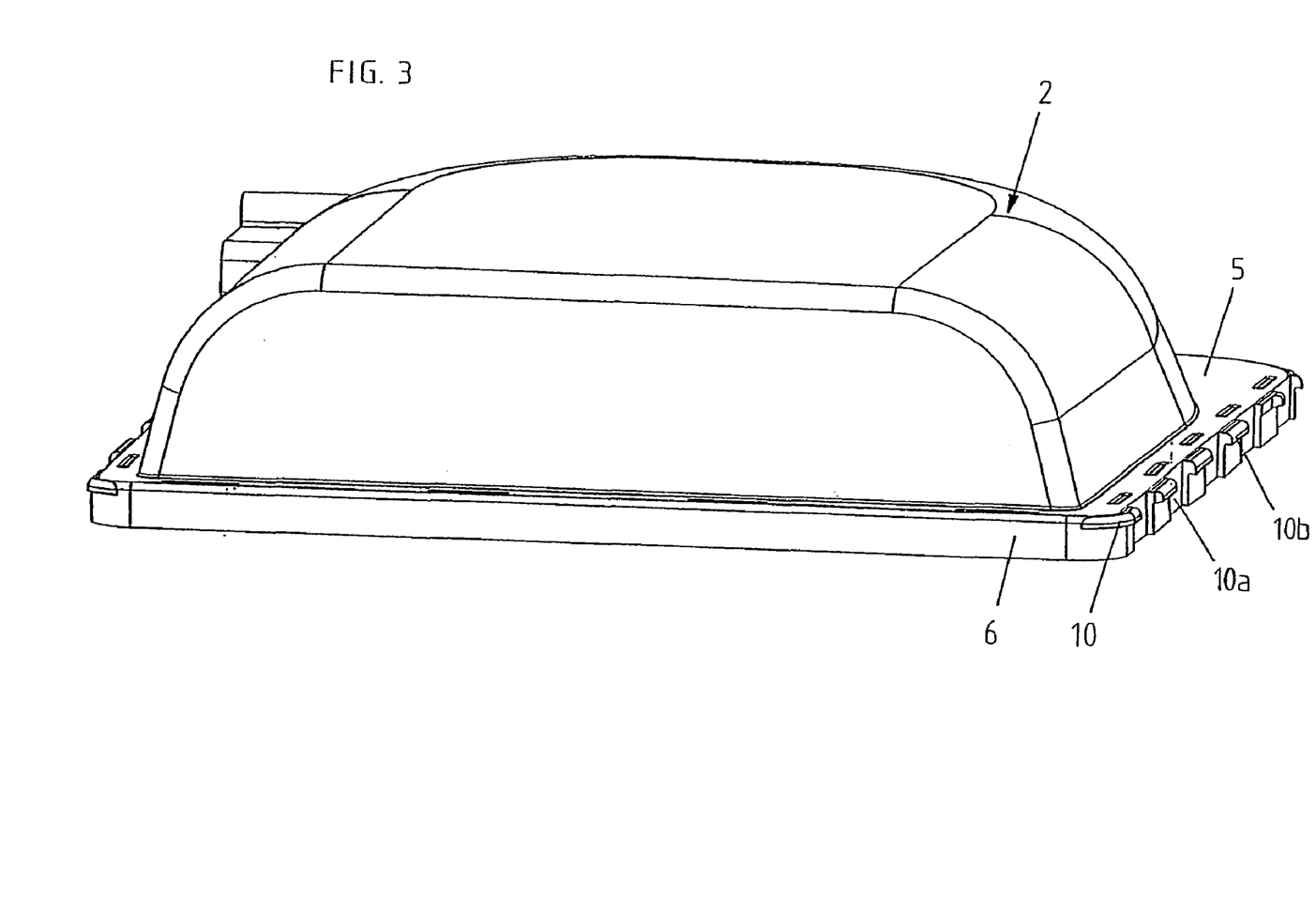
Figure 4:
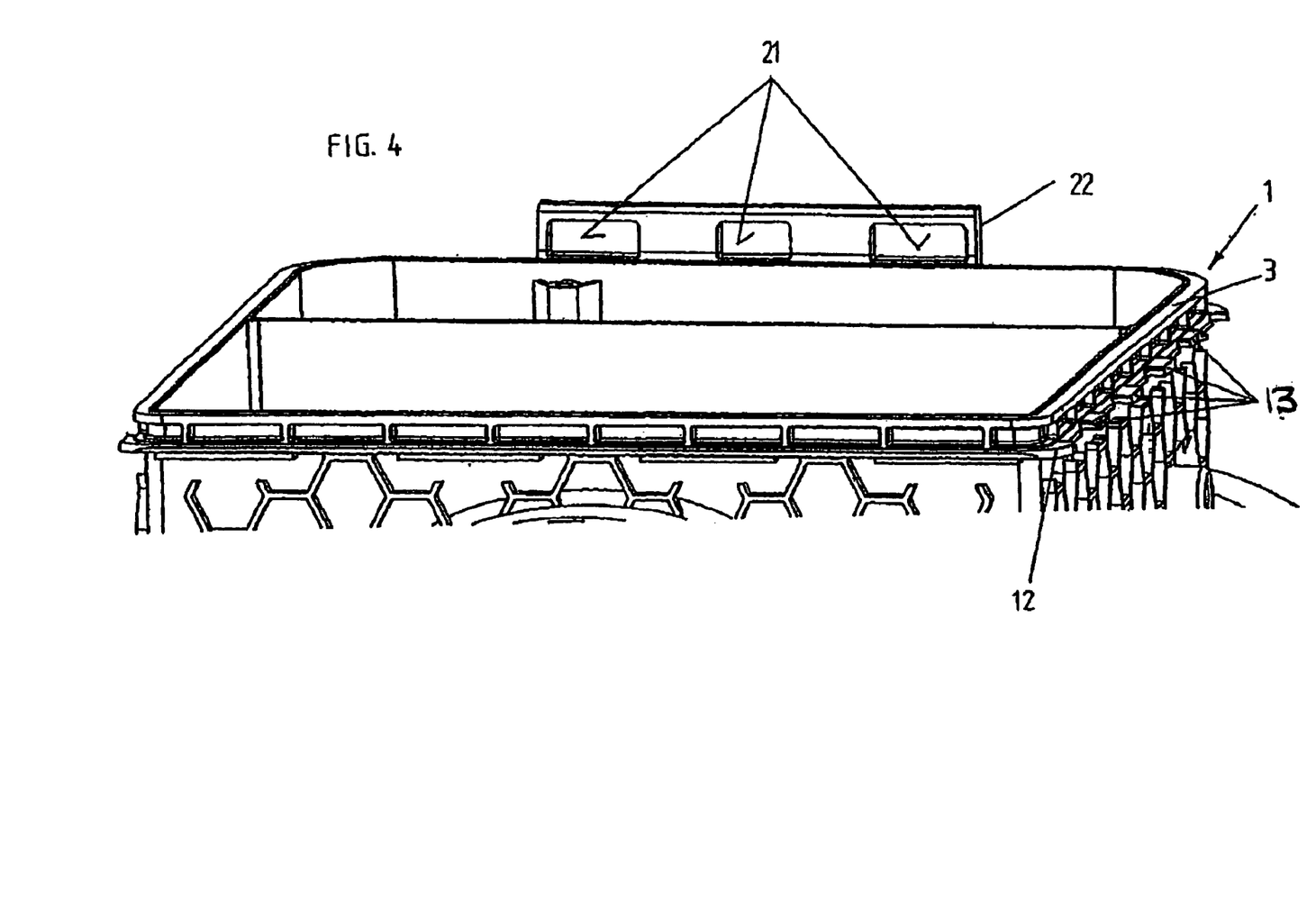

According to FIG. 3, housing cover 2, which is designed as an injection moulded part, is provided with a dome-shaped arch with an all-round shoulder 5 at the bottom end in installed position. In installed position, this shoulder 5 rests on housing edge 3. The perimeter of shoulder 5 is provided with an integrally moulded housing cover web 6 extending downwards. This housing cover web 6 reaches over housing edge 3 when in installed position.

Figure 1:
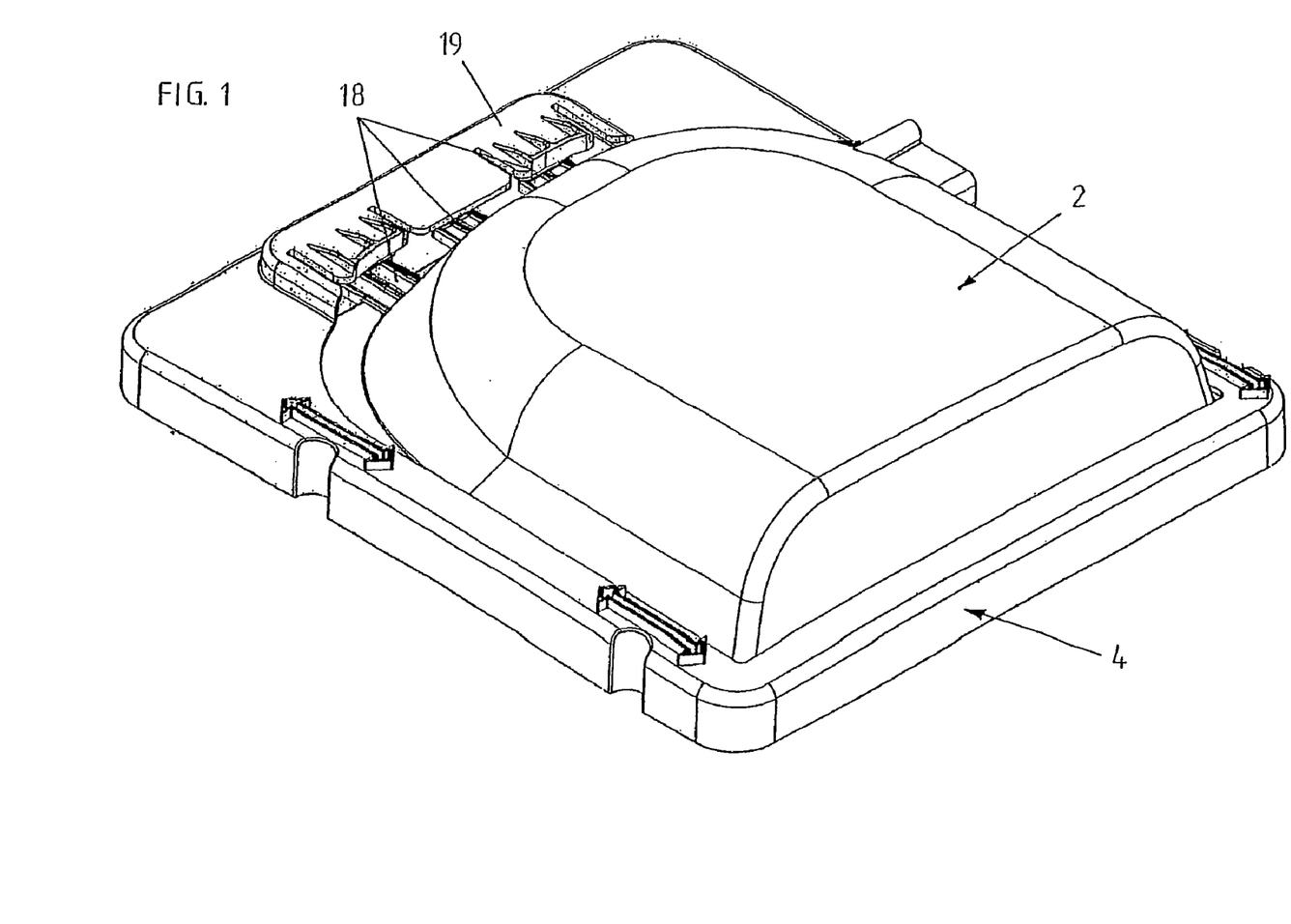
FIG. 1 A perspective view of a locking frame according to the invention with inserted housing cover, FIG. 2 A perspective view of the locking frame, FIG. 3 A perspective view of the housing cover, FIG. 4 A perspective view of the air filter housing to which the housing cover can be fastened using the locking frame, FIG. 5 A top view of the locking frame and the housing cover as per FIG. 1, placed on an air filter housing, FIG. 6 A section along line VI—VI in FIG. 5 with the locking frame in open position, FIG. 6a A section along line VI—VI in FIG. 5 with the locking frame in closed, assembled position, FIG. 7 A section along line VII—VII in FIG. 5, FIG. 8 A section along line VIII—VIII in FIG. 5, and FIG. 9 A top view of the housing cover without locking frame.
Figure 2:
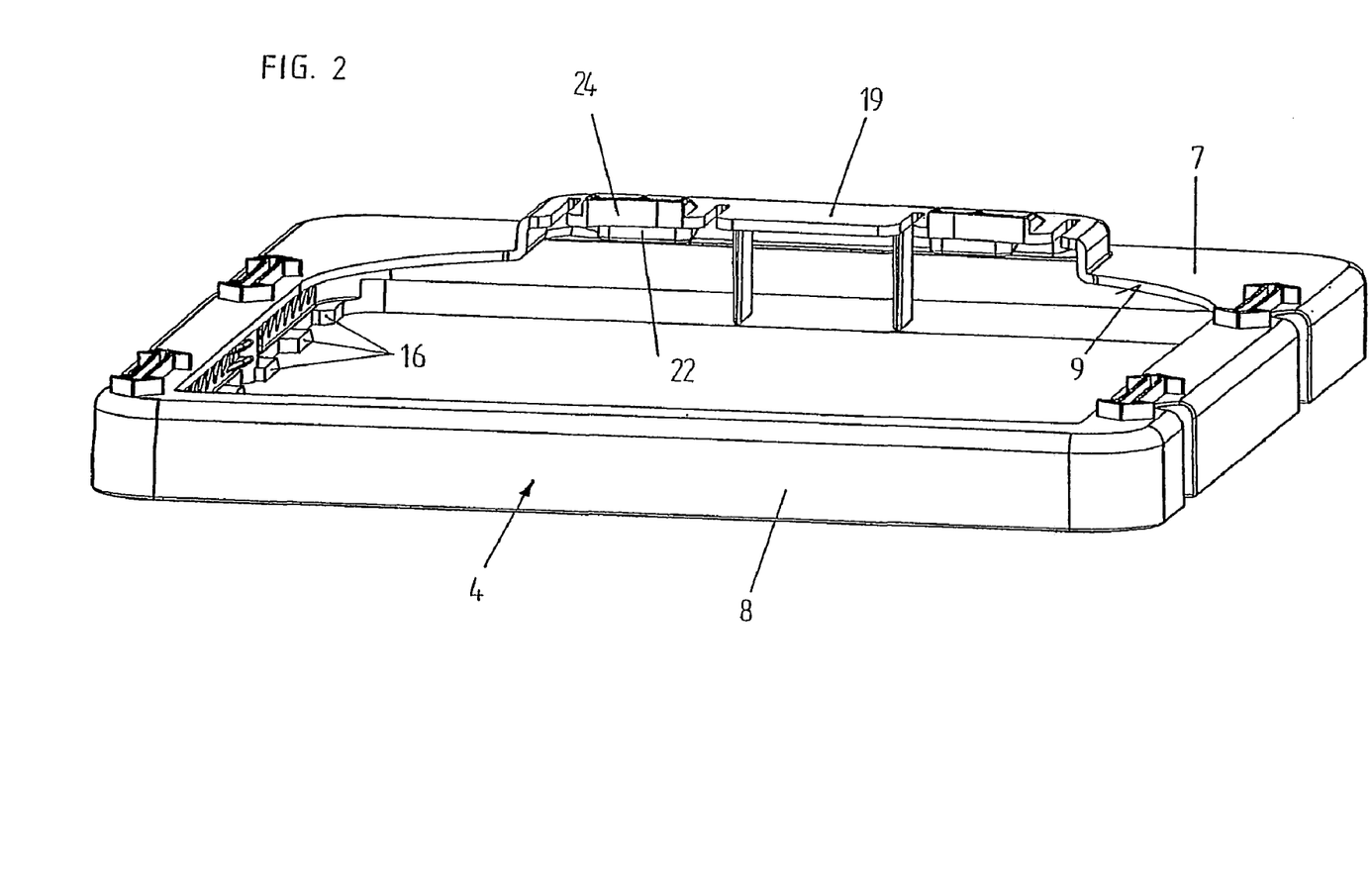

FIG. 2 shows the structure of locking frame 4. Locking frame 4 is designed as a collar-like, closed profile frame reaching over shoulder 5 and housing cover web 6 with an upper section 7 that can be placed on shoulder 5 and from which an all-round locking frame web 8 extends downwards at an angle to upper section 7. Upper section 7 is provided with a cut-out 9, through which the dome-shaped arch of housing cover 2 can pass.

During pre-assembly, locking frame 4 is placed onto housing cover 2 from above, so that upper section 7 of locking frame 4 rests on shoulder 5 of housing cover 2. When locking frame 4 is pressed on, it snaps over housing cover 2, as described in more detail below. In installed position, housing cover 2 is mounted in locking frame 4 in sliding fashion, preferably over a range of 20 mm.

Outward-protruding projections 10, with recesses 10a between them, are provided at regular intervals on two opposite sides of housing cover web 6—referred to below as the longitudinal sides. These projections 10 have outward-protruding shoulders 10a at the upper end.

Provided below housing edge 3 on housing 1 is an outward-protruding, all-round rib 12, which is interrupted at regular intervals on the opposite longitudinal sides in order to form housing tabs 13 at recurring intervals. When housing cover 2 is in place, these housing tabs 13 are in alignment with projections 10 on housing cover web 6 (see FIG. 6).

Figure 7:
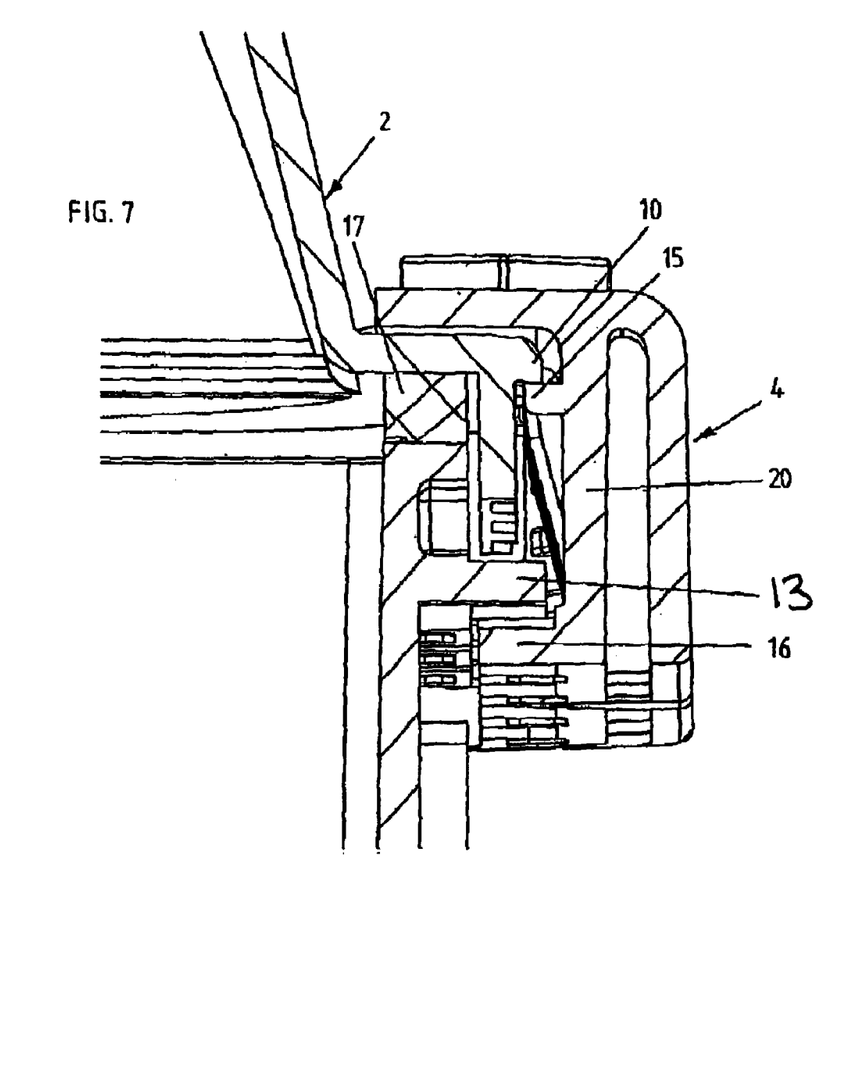

It can be seen from FIG. 7 that, in installed position, shoulders 10b rest in sliding fashion on a first, inward-protruding, all-round rib 15 of locking frame 4, which is integrally moulded on a leg 20 running vertically in installed position. This leg is of resilient design, in order to allow locking frame 4 to be snapped onto housing cover 2. Integrally moulded on leg 20 of locking frame 4, at a distance below the first rib 15 and space apart from each other, are several, inward-protruding frame tabs 16.

Figure 6:
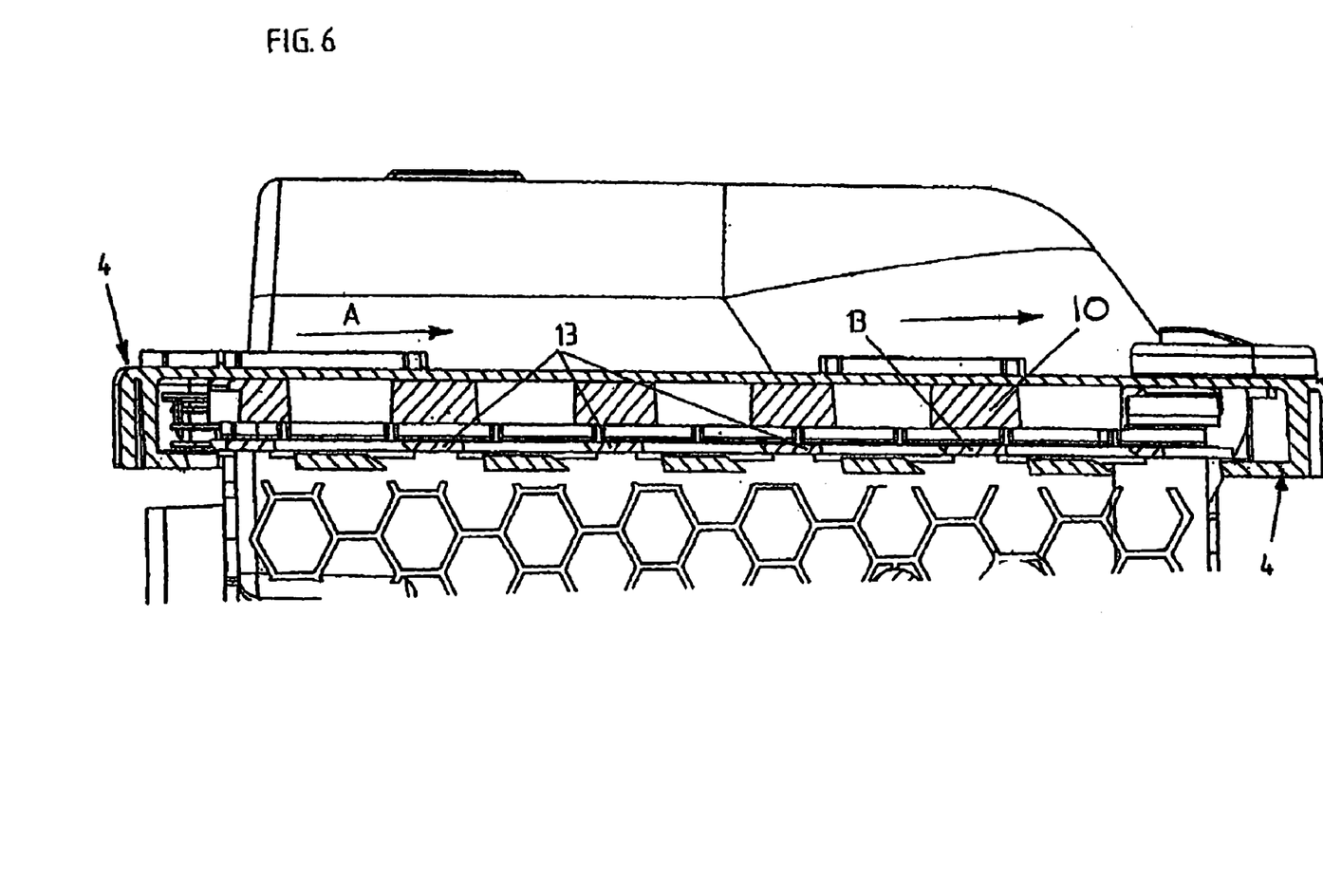
Figure 6A:
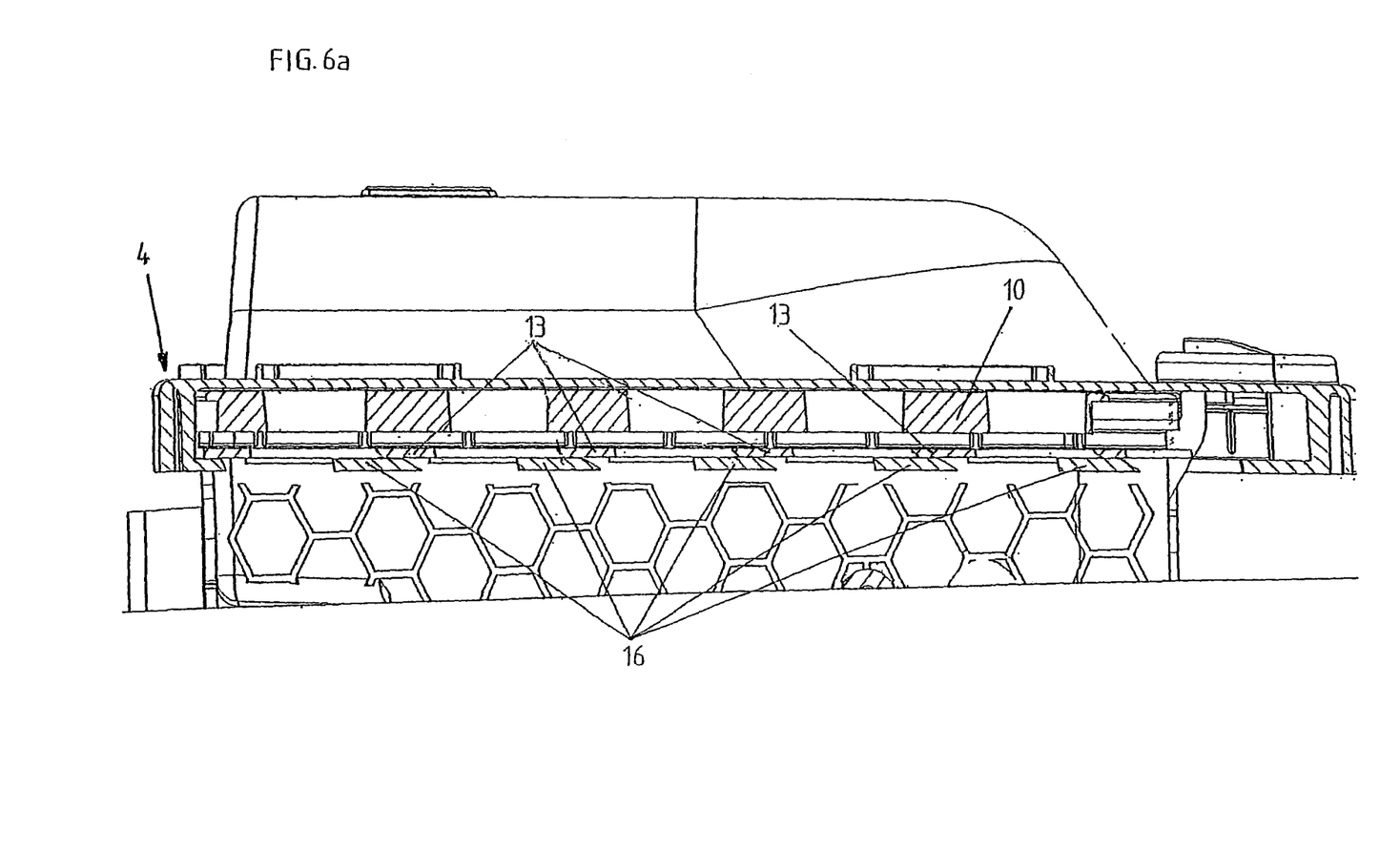

FIGS. 6 and 6a show how, when placing housing cover 2 on housing edge 3, locking frame 4 is moved, by exerting axial thrust in the direction of arrow A, from the open position illustrated in FIG. 6 to the closed position shown in FIG. 6a, in which it reaches around the circumference of both housing cover 2 and housing 1.

After executing closing motion A, frame tabs 16 reach under housing tabs 13 under pre-tension, meaning that they are designed with an interference fit. Housing tabs 13 and frame tabs 16 are provided with run-up bevels of complementary design on their ends lying at the front in the direction of thrust, in order to allow them to move relative to each other without tilting and to realise the interference fit of housing cover 2 on housing 1. As the frame tabs are provided around the entire circumference of locking frame 4, they also reach below all-round rib 12 of housing 1 on its lateral sides, there thus being a circumferential interference fit between housing 1 and housing cover 2 on up to three sides in closed position.

FIG. 7 shows sealing ring 17, which is located between housing cover 2 and housing edge 3. It is held in place on housing edge 3 by means of a shoulder provided on the latter.

As can be seen by looking at FIGS. 1, 4, 8 and 9, three tabs 18, spaced apart from each other, are integrally moulded on the rear end of housing cover 2. In order to fix the housing cover in place when housing cover 2 is placed on housing 1, these tabs 18 are inserted into correspondingly designed cut-outs 21, which are provided at appropriate points on a snap-in web 22 of the air filter housing that projects upwards beyond housing edge 3 and is offset slightly towards the outside.

Figure 5:
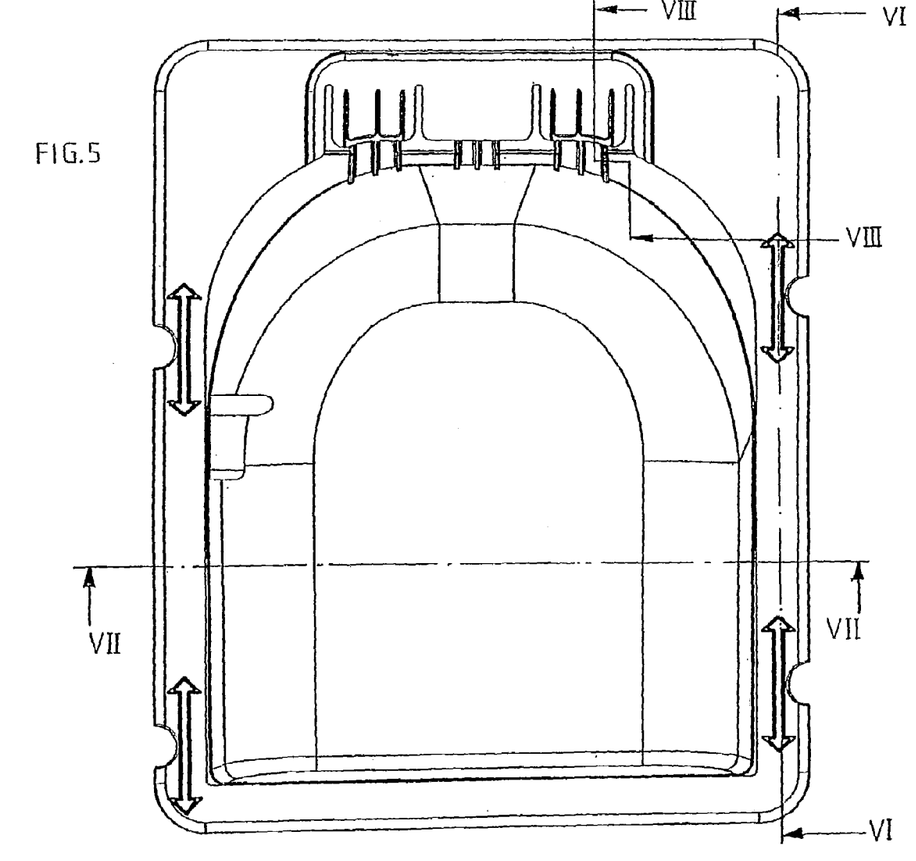
Figure 8:
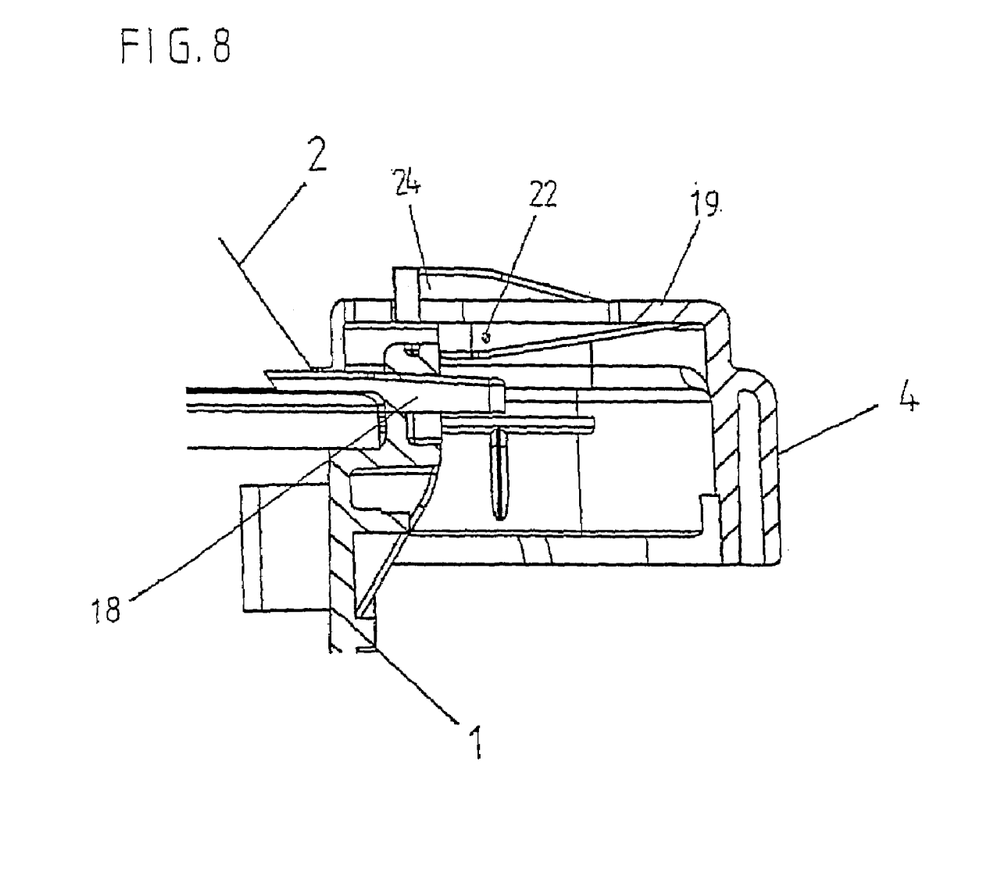
Figure 9:
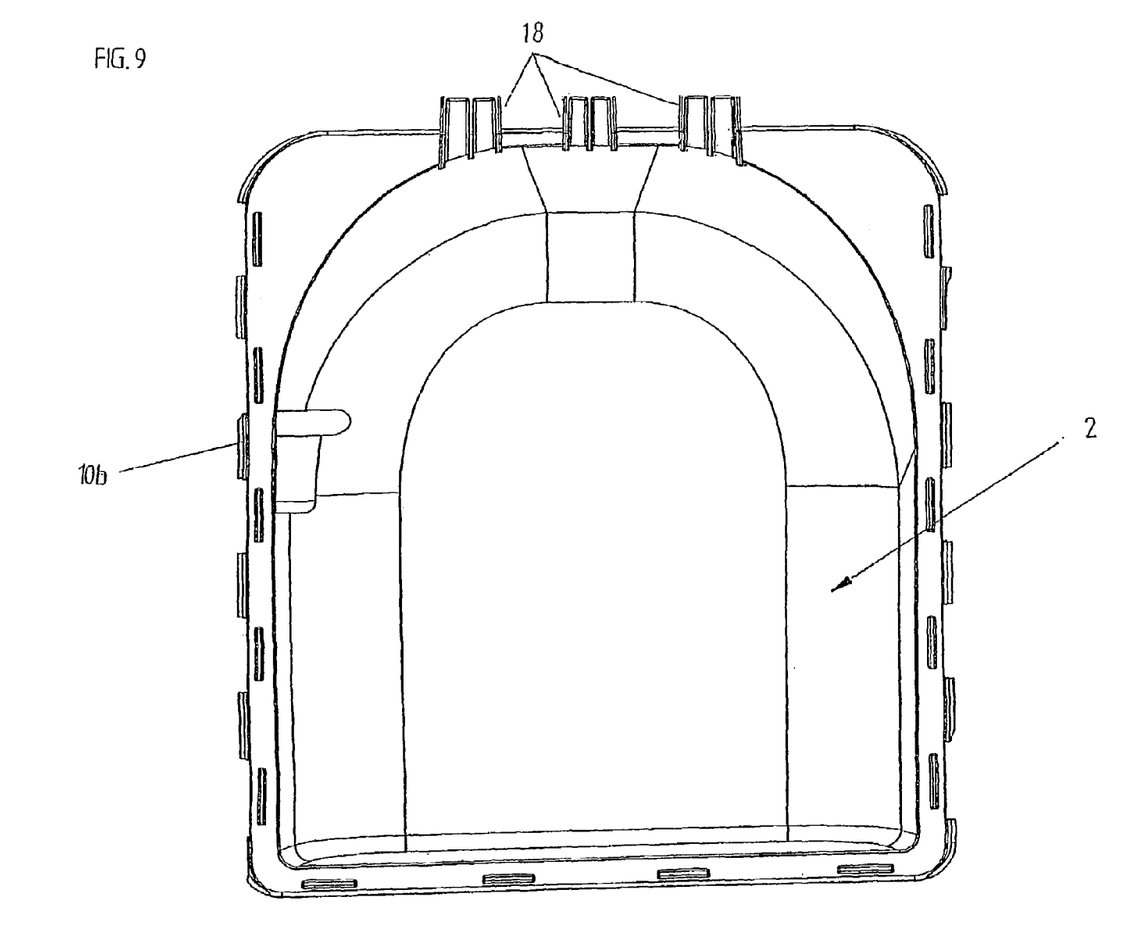

The interaction of tabs 18 and snap-in recess 19 is illustrated in an enlarged view in FIG. 8, which shows a lateral cross-section along line VIII—VIII in FIG. 5. When locking frame 4 has been slid into closed position, projections 23, provided on the underside of snap-in recess 19, reach behind the upper end of the rear side of snap-in web 22. Projections 23 are integrally moulded on snap-in recess 19 in resilient fashion and can be raised via a projection 24, integrally moulded on the upper side of snap-in recess 19, in order to separate the snap-in connection between snap-in web 22 and downward-protruding projections 23. Preferably, two downward-protruding projections 23 and corresponding upward-protruding projections 24 are provided, so that the snap-in connection can be separated with two hands.

The locking frame according to the invention permits simple assembly without tools. No clips, screws or hooks are needed that have to be positioned around the circumference between the housing and the housing cover. The prior art required seven screws or retaining clips for fastening, meaning that the total number of parts has been reduced from a total of nine to two, namely the housing and the housing cover with the locking frame fitted on it. As no retaining clips are required around the circumference, the design of the housing and housing cover is more variable and can be better adapted to prevailing conditions.

| List of reference numbers | |
|---|---|
| 1 | Housing |
| 2 | Housing cover |
| 3 | Housing edge |
| 4 | Locking frame |
| 5 | Shoulder |
| 6 | Housing cover web |
| 7 | Upper section |
| 8 | Locking frame web |
| 9 | Cut-out |
| 10 | Projection |
| 10a | Cut-out |
| 10b | Shoulder |
| 12 | Rib |
| 13 | Housing tab |
| 15 | First rib |
| 16 | Frame tab |
| 17 | Sealing ring |

-continued

| List of reference numbers | |
| --- | --- |
| 18 | Snap-in tab |
| 19 | Snap-in recess |
| 20 | Leg |
| 21 | Cut-out |
| 22 | Snap-in web |
| 23 | Projection |
| 24 | Projection |

The invention claimed is:

1. Closing device for an essentially box or shell-shaped housing that can be closed by a housing cover comprising a housing cover including a housing with a housing edge with a seal onto which said housing cover is connectable to said housing, and a closed profile locking frame, characterised in that the housing cover and the housing can be connected to one another by means of said closed profile locking frame where said locking frame surrounds said housing cover around the entire circumference of the housing in the region of the housing edge, and wherein said locking frame is positioned into a closed position by means of a translatory motion, which presses said housing cover onto said housing edge.

2. Closing device as per claim 1, characterised in that the edge of the housing cover can be connected to a side of the locking frame that is on top in installed position, in that the housing cover is mounted in a manner permitting relative movement in the locking frame and in that a side of the locking frame that is on the bottom in installed position can be placed on the housing edge and the looking frame connected to it by means of translatory motion.

3. Closing device as per claim 1, characterised in that snap-in elements acting between the locking frame and the housing cover and/or the locking frame and the housing are provided.

4. Closing device as per claim 1, characterised in that snap-in elements preventing relative displacement of the locking frame and the housing cover are provided between the locking frame and the housing cover.

5. Closing device as per claim 1, characterised in that the locking frame can be connected to the housing and/or the housing cover in separable fashion.

6. Closing device as per claim 1, characterised in that the locking frame is designed as an injection-moulded plastic part.

7. Closing device as per claim 1, characterised in that snap-in elements are provided between the housing cover and the housing, which prevent relative displacement between the housing cover and the housing in closed position.

* * * * *

UNITED STATES PATENT AND TRADEMARK OFFICE
CERTIFICATE OF CORRECTION

| | | |
|---|---|---|
| PATENT NO. | : 7,217,308 B2 | Page 1 of 1 |
| APPLICATION NO. | : 10/415603 | |
| DATED | : May 15, 2007 | |
| INVENTOR(S) | : Thanheiser | |

It is certified that error appears in the above-identified patent and that said Letters Patent is hereby corrected as shown below:

In column 6, line 5, in Claim 2, delete "looking" and insert -- locking --, therefor.

Signed and Sealed this

Eighteenth Day of March, 2008

JON W. DUDAS
*Director of the United States Patent and Trademark Office*